Patented July 21, 1931

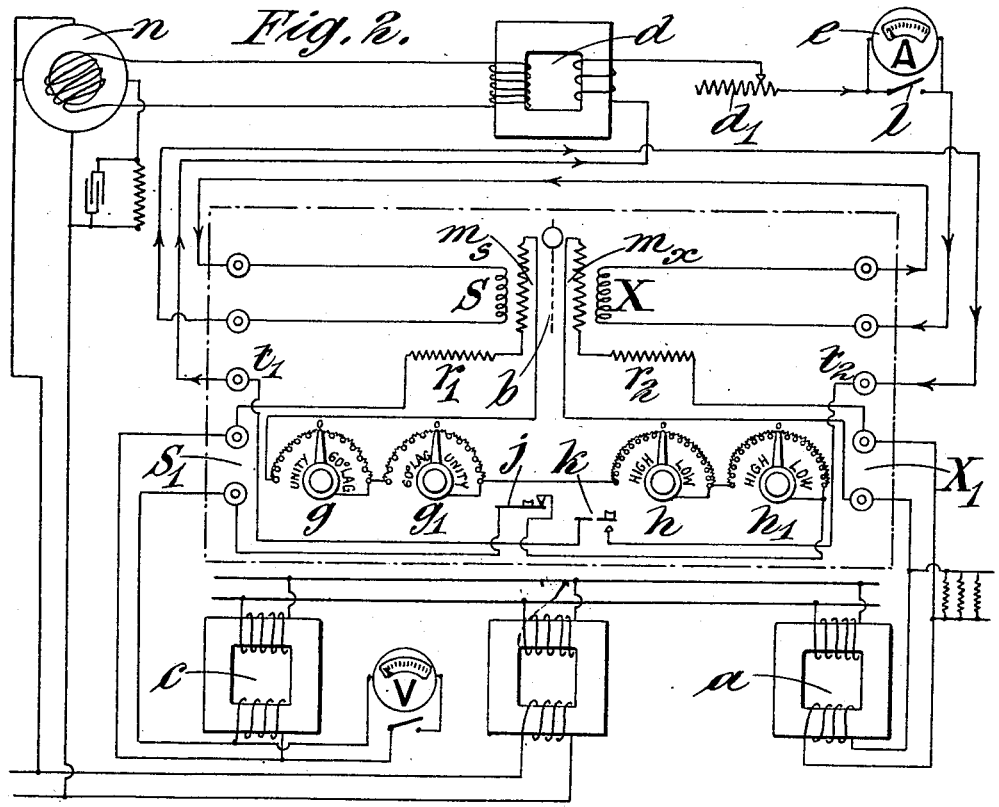

1,815,217

UNITED STATES PATENT OFFICE

GEORGE FREDERICK SHOTTER, OF NEW SOUTHGATE, ENGLAND

ELECTRICAL TESTING APPARATUS

Application filed December 9, 1926, Serial No. 153,651, and in Great Britain December 10, 1925.

This invention relates to electrical testing and more particularly to the testing of electrical instrument transformers and has for its object to provide improved or simplified methods and means therefor.

Referring to the accompanying drawings:—

Fig. 2 is an analogous diagram illustrating the testing of potential transformers.

Figure 1:
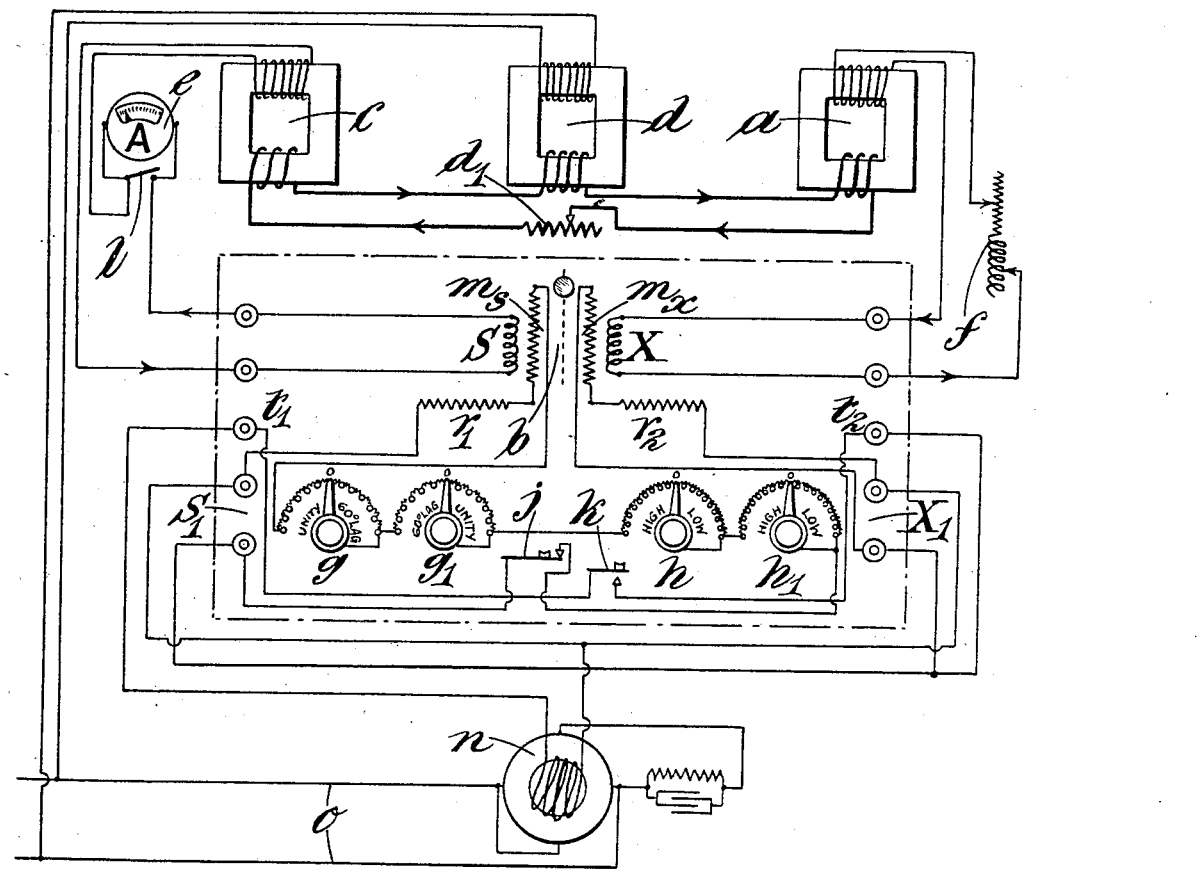
Fig. 1 is an electrical diagram illustrating one convenient arrangement for testing current transformers in accordance with the present invention.

The invention consists briefly in a method of and means for ascertaining the errors in instrument transformers, wherein a winding of the transformer to be tested is connected to one element of a double element output measuring means, such as a watt meter, a winding of a standard transformer (or one of predetermined characteristics) is connected to the other element of said output measuring means, said transformers are excited from a common source of current and compensating means which constitute a function of the error present are applied to one or other of said elements until a balance is secured.

The invention also consists in a method of and means for determining the errors in a transformer for subsequent use as a standard wherein the transformer is wound to a 1/1 ratio and the primary and secondary windings are connected respectively to the two elements of a double element output measuring means such as a watt meter, one of the windings being connected also to an external source of current and compensating means which constitute a function of the error present are applied to one or other of the said elements until a balance is secured.

The invention also consists in apparatus for electrical testing in accordance with the methods described above including a double element dynamometer watt meter, a plurality of suitably calibrated variable resistances connected in the potential circuit of one element and a tapping switch, all mounted to form a portable unit.

In carrying the invention into effect in one form illustrated by way of example in Fig. 1 as applied to the testing of the "ratio" and "angle" errors in a current instrument transformer $a$, a double element dynamometer watt meter $b$ is employed, the secondary currents of a standard transformer $c$ being balanced against the secondary currents of the transformer $a$ of unknown characteristics. The primary windings of the two transformers $a$, $c$ are connected in series to the secondary winding of a current supply transformer $d$.

The secondary winding of the standard transformer $c$ is connected to the winding S of the watt meter, a standard ammeter $e$ being included in series. This ammeter is used merely to enable the correct currents to be applied to the transformers $a$ and $c$ and during actual tests is short circuited by the switch $l$.

The secondary winding of the transformer $a$ is connected through a calibrated variable non-inductive and/or inductive (as required) load $f$ to the other winding X of the watt meter.

Previous to carrying out the test the two elements of the watt meter are balanced by placing the current coils S, X of the watt meter in series and the potential coils $m_s$ and $m_x$ in parallel (the two elements being in opposition) and adding the necessary resistance to one or other element so as to produce a balance. This resistance, which in a high class watt meter is small, is incorporated in the shunt circuit of the element to which it is added and is treated as part of its circuit.

The winding $m_x$ of the watt meter is connected through a resistance $r_2$ to the terminals $X_1$ while the winding $m_s$ is connected through the resistance $r_1$, four adjustable calibrated series resistances $g$, $g_1$, $h$, $h_1$, and a power factor setting tapping switch $j$ to the terminals $S_1$.

A phase shifter $n$ is provided and is energized from A. C. mains $o$ (conveniently of say 150 volts) which latter also supply current to the transformer $d$. The phase shifter is connected at one side to one of terminals $S_1$, and to one of the terminals $X_1$, and at the other side through a terminal $t_1$, to a tapping key $k$, and a terminal $t_2$ to the other of the terminals $S_1$, and $X_1$.

The rheostat $g$ is calibrated for compensating for the inherent errors in the standard current transformer employed while the rheostat $g_1$ is calibrated for compensating the inherent errors in the standard potential transformer employed during similar tests of the potential transformers.

The rheostat $h$ and $h_1$ are calibrated for coarse and fine indications of percentage errors in the transformer to be tested.

The fixed resistances $r_1$ and $r_2$ provide the main resistance of the two potential elements of the watt meter.

To carry out a test, current is switched on, the load of the transformers $a$ and $c$ is set by means of the rheostat $d_1$ to the desired figure and the ammeter switch $l$ is then closed.

The voltage and current supply must now be brought into phase this being effected by closing the tapping switch $k$ and opening the tapping switch $j$ whilst the phase shifter $n$ is rotated to bring the watt meter indicator to zero and then by setting the phase shifter arm and rotating the phase shifter backwards through 90°.

The switch $j$ is now closed and the watt meter indicator will move in one or other direction according to whether the current supplied to the watt meter coil X is lower or higher than the current suplied to the coil S.

The indicator is caused to return to zero by varying the resistance $h$, $h_1$ the tapping switch $j$ being constantly operated until no visible deflection of the watt meter indicator is obtained. In the example resistance is varied in the circuit including the watt meter element on the standard transformer side but it may be in the circuit including the watt meter element on the side of the transformer under test. Under these conditions the two current transformers $a$ and $c$ are balanced and the difference in resistance can be expressed as per cent. or as a ratio. This per cent. or ratio is obtained from a chart compiled for the current transformer testing. The phase shifter is now rotated until its index arm points to the potential leading 60°, i. e. the current lagging 60°. The tapping switch $j$ is again operated and the watt meter indicator moves slightly, say in the opposite direction. The indicator is again brought back to zero by varying resistance $h$, $h_1$, the tapping switch $k$ being constantly operated as before until there is no visible movement of the indicator. Now the two current transformers are again balanced and the difference in resistance can again be expressed as a percentage. We have now two values of resistance as obtained from the 0° test and the 60° test. The algebraic sum of these two resistances expresses the angle of error in the transformer $a$.

Series of readings of resistance required to be added to one or other of the elements are taken at full, three-quarters, one-half, one-tenth and one-twentieth or other loads, first with the current in the primary of the transformers in phase with the pressure applied to the potential circuits of the watt meter and secondly with the primary current lagging sixty degrees in phase.

The values of resistance added on unity power factor are functions of the ratio error alone (the effect of the angle error being negligible) whereas the values obtained under the condition of 0.5 power factor are functions of the sum of the ratio and angle errors. Thus determination of the individual errors is arrived at, being expressed as the algebraic difference between the errors calculated from results of the two sets of tests.

Similar procedure is adopted in the case of potential transformers the appropriate electrical connections being shown in Fig. 2.

The arrangement will be seen to be very similar to that for testing current transformers shown in Fig. 1. $a$ is the transformer to be tested and $c$ is the standard transformer, the primary windings of the two transformers being connected in parallel with the secondary winding of a supply transformer shown between them. $b$ is the double element dynamometer watt-meter, $g$, $g_1$, $h$, $h_1$ resistances, $S_1$, $X_1$ terminals and $j$ and $k$ switches as in Fig. 1. The secondary winding of the standard transformer $c$ is connected to the terminals $S_1$ and the secondary winding of the transformer $a$ to the terminals $X_1$. The current coils S, X of the watt-meter and the switch $k$ are connected in series through the secondary of the supply transformer $d$ whose primary is connected to the phase advancer $n$. $d_1$ is a load controlling resistance for the watt-meter coils S, X. A is an ammeter to measure said load and $l$ is a short circuiting switch. V is a voltmeter to measure the potential at the secondary of the standard transformer.

In operation the voltage and current supply are first brought into phase by opening the switch $j$, closing $k$ and rotating the phase advancer $n$ to bring the watt-meter indicator to zero. This indicates that the current and voltage supply to the watt-meter are out of phase by 90°. The phase advancer arm is then set and the phase advancer is moved backwards through 90°. The resistance $g_1$ is set to compensate for the known inherent errors in the standard transformer.

The switch $j$ is now closed and the switch $k$ is closed when the watt-meter indicator will move in one or the other direction according to whether the potential applied to one of the potential coils of the watt-meter is lower or higher than the potential applied to the other of the potential coils. The indicator is caused to return to zero by varying the resistance $h$, $h_1$, the tapping switch $k$ being constantly operated until no visible deflection of the watt-meter indicator is obtained. Under these conditions the two transformers $a$ and $c$ are balanced and the differences in resistance can be expressed as a percentage or as a ratio which is obtained from a chart compiled for the potential transformer testing. The phase shifter is now rotated until its indicator arm points to the potential leading 60°. Another value of resistance $h$, $h_1$ is then obtained which is required to produce no deflection of the watt-meter indicator. Tests are carried out at various loads as is described with the arrangement illustrated in Fig. 1.

It is only necessary to test such a multi-range transformer at one ratio since there is no appreciable alteration of the errors at different ratios and conveniently we wind the transformer for a ratio of 1/1 and determine its errors firstly with the current in the primary in phase with the pressure applied to the potential circuits and secondly with this current lagging (about 60°). If it be assumed that the angle errors of the watt meter shunt circuits are zero or identical and that the resistance which is added to produce balance is non-inductive then the resistance added is a measure of the error of the transformer expressed as the percentage of the total resistance of the watt meter shunt circuit which the added resistance in that circuit represents.

As already indicated above, the angle error may be neglected at the unity power factor ratio test but then determining the angle error (at about .5 power factor) the algebraic difference has to be taken between the errors calculated from the test at unity power factor and the test at about .5 power factor.

The procedure indicated above determines with extreme accuracy the characteristics of the transformer but enables the small errors present to be compensated when it is used in the determination of the errors in an unknown transformer.

This compensation is effected conveniently by connecting in the watt meter pressure circuits (of one or other units, e. g. according as the loading is at unity or reduced power factor) resistances having values ascertained as above.

What I claim is:

1. Means for ascertaining the ratio and angle errors in an instrument transformer comprising a double element dynamometer watt-meter to one coil of one element of which a winding of the transformer is to be connected and to one coil of the other element of which a winding of a transformer of predetermined characteristics is to be connected, phase shifting means connected to the other coils of the two elements, means which will constitute a function of the error present in the transformer under test connected to the potential circuit of one or other of the elements to the double element dynamometer watt-meter and a tapping key connected to said means.

2. Means for ascertaining the ratio and angle errors in an instrument transformer wound to a 1—1 ratio comprising a double element indicating watt-meter to one coil of one element of which one winding of the transformer is to be connected in series with a source of current and to one coil of the other element of which the other winding of the transformer is to be connected, phase shifting means connected to the other coils of the two elements, means which will constitute a function of the error present in the transformer connected in the circuit of one of the windings of the transformer and a tapping key connected to said means.

Dated this 26th day of November, 1926.
GEORGE FREDERICK SHOTTER.